US012475870B2

(12) United States Patent
Mori

(10) Patent No.: US 12,475,870 B2
(45) Date of Patent: Nov. 18, 2025

(54) ELECTRONIC HI-HAT

(71) Applicant: Ef-Note Inc., Hamamatsu (JP)

(72) Inventor: Yoshiaki Mori, Hamamatsu (JP)

(73) Assignee: Ef-Note Inc., Hamamatsu (JP)

( * ) Notice: Subject to any disclaimer, the term of this patent is extended or adjusted under 35 U.S.C. 154(b) by 752 days.

(21) Appl. No.: 17/509,025

(22) Filed: Oct. 24, 2021

(65) Prior Publication Data

US 2022/0044664 A1 Feb. 10, 2022

Related U.S. Application Data

(63) Continuation of application No. PCT/JP2020/018632, filed on May 8, 2020.

(30) Foreign Application Priority Data

May 9, 2019 (JP) ................................ 2019-089300

(51) Int. Cl.
*G10H 1/055* (2006.01)
*G10D 13/065* (2020.01)
(Continued)

(52) U.S. Cl.
CPC ......... *G10H 1/0553* (2013.01); *G10D 13/065* (2013.01); *G10D 13/26* (2020.02); *G10H 1/34* (2013.01); *G10H 2230/331* (2013.01)

(58) Field of Classification Search
CPC .. G10H 1/34; G10H 1/0553; G10H 2230/331; G10D 13/26; G10D 13/065
See application file for complete search history.

(56) References Cited

U.S. PATENT DOCUMENTS 8,410,348 B1 4/2013 Hsieh
8,742,244 B2 6/2014 Wissmuller
(Continued)

FOREIGN PATENT DOCUMENTS

CN 202454248 U 9/2012
EP 3428912 A1 1/2019
(Continued)

OTHER PUBLICATIONS

International Search Report dated Jul. 14, 2020 in corresponding PCT Application No. PCT/JP2020/018632.
(Continued)

*Primary Examiner* — Dedei K Hammond
*Assistant Examiner* — Philip G Scoles
(74) *Attorney, Agent, or Firm* — Harness, Dickey & Pierce, P.L.C.

(57) ABSTRACT

An electronic hi-hat 1 has a rod movable up and down with an operation of a player. A top cymbal 2 has a striking surface that can be struck by the player. A bottom cymbal 3 comes into contact with or separates from the top cymbal 2. An optical sensor 7 detects separation dimension between the top cymbal 2 and the bottom cymbal 3. The optical sensor 7 detects separation dimensions of a plurality of areas that are displaced with inclinations of the top cymbal 2 and the bottom cymbal 3 with respect to the rod r. The plurality of areas where the separation dimensions are detected are located on a common circumference of the top cymbal 2 and the bottom cymbal 3 around the rod r as a center.

9 Claims, 14 Drawing Sheets

(51) Int. Cl.

| | |
|---|---|
| ***G10D 13/10*** | (2020.01) |
| *G10H 1/34* | (2006.01) |

(56) References Cited

U.S. PATENT DOCUMENTS

| | | | | |
|---|---|---|---|---|
| 8,785,758 B2 | 7/2014 | Wissmuller | | |
| 9,053,693 B1 | 6/2015 | Wei | | |
| 10,937,399 B2 | 3/2021 | Shemesh | | |
| 2013/0047826 A1* | 2/2013 | Wissmuller | ............ | G10H 3/146 84/723 |
| 2015/0143979 A1* | 5/2015 | Field | ...................... | G10D 13/11 84/730 |

FOREIGN PATENT DOCUMENTS

| | | | | |
|---|---|---|---|---|
| JP | 3674770 | B2 | * | 7/2005 |
| JP | 2005-208555 | A | | 8/2005 |
| JP | 2009-069848 | A | | 4/2009 |
| JP | 2009145561 | A | * | 7/2009 |
| JP | 6236555 | B1 | * | 11/2017 |
| JP | 2018-124364 | A | | 8/2018 |
| JP | 2018-146820 | A | | 9/2018 |
| JP | 6443868 | B1 | | 12/2018 |

OTHER PUBLICATIONS

Chinese Office Action dated Dec. 10, 2024 in corresponding Chinese Application No. 202210418082.6.

* cited by examiner

Fig. 6
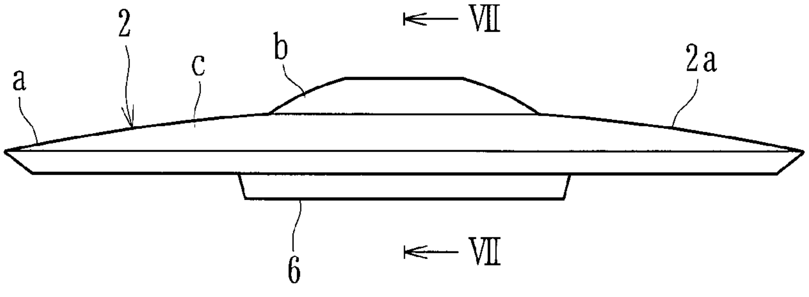
[ Fig. 7 ]
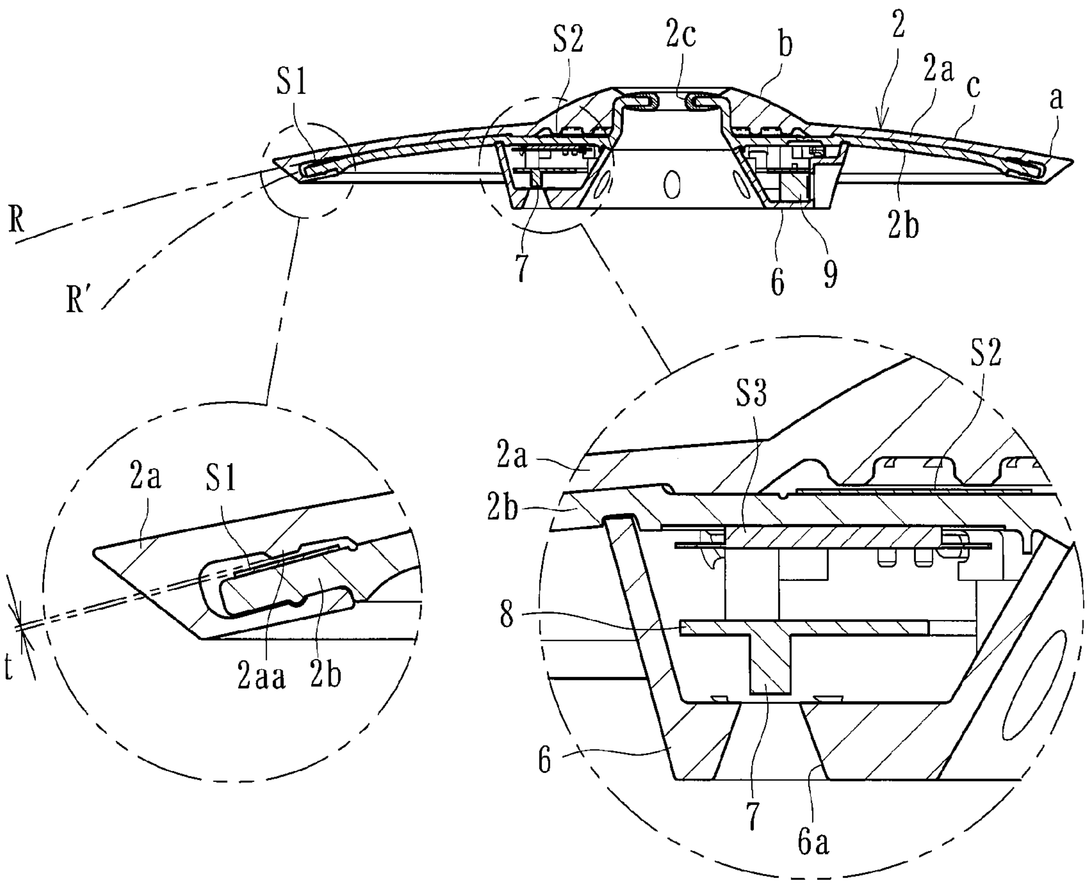

ELECTRONIC HI-HAT

CROSS-REFERENCE TO RELATED APPLICATIONS

This application is a continuation of International Application No. PCT/JP2020/018632, filed May 8, 2020, which claims priority to Japanese Application No. 2019-089300, filed May 9, 2019. The disclosures of the above applications are incorporating herein by reference.

FIELD

The present disclosure relates to an electronic hi-hat capable of making an output at the time of striking a striking surface differently in accordance with contact or separation between a top cymbal and a bottom cymbal.

BACKGROUND

An electronic hi-hat of related art that can electronically output an acoustic hi-hat sound is disclosed in, for example, Japanese Unexamined Patent Application Publication No. 2018-124364 and Japanese Unexamined Patent Application Publication No. 2005-208555. In such an electronic hi-hat, a top cymbal and a bottom cymbal are attached to face each other in an up-down direction. The top cymbal is coupled to a rod that moves up and down in accordance with an operation of a player. Thus, the top cymbal and the bottom cymbal are capable of coming into contact with or separating from each other.

Moreover, the electronic hi-hat of the related art includes an optical sensor capable of detecting a separation dimension between the top cymbal and the bottom cymbal. Contact or separation between the top cymbal and the bottom cymbal can be detected using the separation dimension detected by the optical sensor. When it is detected that the player has struck the striking surface of the top cymbal with a stick, the output is made different in accordance with the contact or the separation between the top cymbal and the bottom cymbal. This enables performance similar to that of an acoustic hi-hat.

SUMMARY

In the related art, the separation dimension between the top cymbal and the bottom cymbal is detected in an extension direction, the vertical direction, of the rod. The top cymbal and the bottom cymbal are inclined with respect to the rod in a state where the top cymbal and the bottom cymbal are in contact with each other. Thus, a dimension larger than the actual separation dimension may be detected. This may lead to erroneous detection that the top cymbal and the bottom cymbal are separate from each other although the top cymbal and the bottom cymbal are in contact with each other. It has been difficult to correctly output the performance of the player.

The present disclosure provides an electronic hi-hat capable of accurately detecting a separation dimension between a top cymbal and a bottom cymbal. This occurs even when the top cymbal and the bottom cymbal are inclined with respect to a rod.

According to the disclosure, an electronic hi-hat includes a rod that is movable up and down in accordance with an operation of a player. A top cymbal has a striking surface that can be struck by the player. It is movable up and down in accordance with a movement of the rod. A bottom cymbal is attached to face the top cymbal. The bottom cymbal is capable of coming into contact with or separating from the top cymbal that moves up and down with the movement of the rod. A detector detects a separation dimension between the top cymbal and the bottom cymbal. The detector detects separation dimensions of a plurality of areas that are displaced with inclinations of the top cymbal and the bottom cymbal with respect to the rod. The plurality of areas where the separation dimensions are detected are located on a common circumference of the top cymbal and the bottom cymbal around the rod as a center.

In the electronic hi-hat, the detector detects separation dimensions of areas at at least three or more positions separate at equal intervals on the common circumference of the top cymbal and the bottom cymbal around the rod as the center.

In the electronic hi-hat, the detector includes a distance sensor disposed in at least one of the top cymbal and the bottom cymbal. The distance sensor is capable of detecting, in a non-contact manner, the separation dimensions of the plurality of areas that are displaced with the inclinations of the top cymbal and the bottom cymbal with respect to the rod.

In the electronic hi-hat, the distance sensor included an optical sensor. It detects the separation dimensions by emitting light and receiving reflected light of the light. A reflection surface, that can reflect the light emitted from the optical sensor, is formed on the other one of the top cymbal and the bottom cymbal.

In the electronic hi-hat, the electronic hi-hat includes a light guide portion that widens from a light emission position of the optical sensor toward the reflection surface.

In the electronic hi-hat, relative angles, dimensions, or positional relationship of the top cymbal and the bottom cymbal can be calculated based on a plurality of detection values detected by the detector.

In the electronic hi-hat, the bottom cymbal has a region that is elastically deformable by a pressing force generated when the top cymbal comes into contact with the bottom cymbal.

In the electronic hi-hat, the region that is elastically deformable includes a notch portion in the bottom cymbal.

In the electronic hi-hat, the top cymbal includes a pad with the striking surface and a frame that supports the pad. An edge sensor detects a strike by the player. The edge sensor is attached to a peripheral edge portion of the frame. The pad continuously extends from a center toward a peripheral edge portion. The frame continuously extends from a center toward the peripheral edge portion. The peripheral edge portion of the frame has a larger inclination angle than an inclination angle of the peripheral edge portion of the pad.

In the electronic hi-hat, the pad and the frame continuously extend from the respective centers toward the respective peripheral edge portions while having predetermined curvatures. A curvature of the peripheral edge portion of the frame is set to be larger than a curvature of the peripheral edge portion of the pad. The peripheral edge portion of the frame has the larger inclination angle than the inclination angle of the peripheral edge portion of the pad.

The detector detects the separation dimensions of the plurality of areas that are displaced with the inclinations of the top cymbal and the bottom cymbal with respect to the rod. The plurality of areas where the separation dimensions are detected are located on the common circumference of the top cymbal and the bottom cymbal around the rod, as the center. Thus, even when the top cymbal and the bottom cymbal are inclined with respect to the rod, the separation dimension between the top cymbal and the bottom cymbal can be accurately detected.

The detector detects the separation dimensions of the areas at the at least three or more positions separate at the equal intervals on the common circumference of the top cymbal and the bottom cymbal around the rod as the center. Thus, by electrically averaging or electronically calculating the detection values of the respective detector, the average separation dimension can be detected even when one of the top cymbal and the bottom cymbal is inclined.

The detector includes the distance sensor disposed in the at least one of the top cymbal and the bottom cymbal. The distance sensor detects in a non-contact manner, the separation dimensions of the plurality of areas that are displaced with the inclinations of the top cymbal and the bottom cymbal, with respect to the rod. Thus, the contact or the separation between the top cymbal and the bottom cymbal can be reliably detected. Thus, during performance, the player can bring the top cymbal and the bottom cymbal into contact with each other or separate the top cymbal and the bottom cymbal from each other without feeling discomfort.

The distance sensor include the optical sensor that can detect the separation dimensions by emitting the light and receiving the reflected light, of the light. The reflection surface, that reflects the light emitted from the optical sensor, is formed on the other one of the top cymbal and the bottom cymbal. Thus, the separation dimension between the top cymbal and the bottom cymbal can be detected using the optical sensor that is relatively inexpensive and has high detection accuracy.

The provided light guide portion widens from the light emission position of the optical sensor toward the reflection surface. Thus, it is possible to prevent erroneous detection from occurring due to ambient brightness. Thus, it is possible to stably and accurately detect the separation dimension between the top cymbal and the bottom cymbal.

The relative angles, the dimensions, or the positional relationship of the top cymbal and the bottom cymbal can be calculated based on the plurality of detection values detected by the detector. Thus, the relative angles, the dimensions, or the positional relationship of the top cymbal and the bottom cymbal can be reflected on the output during performance.

The bottom cymbal has the region that is elastically deformable by the pressing force generated when the top cymbal comes into contact with the bottom cymbal. Thus, the separation dimension between the top cymbal and the bottom cymbal can be changed by the pressing force generated when the top cymbal and the bottom cymbal come into contact with each other. The change in the separation dimension can be reflected on the output during performance.

The region that is elastically deformable includes the notch portion in the bottom cymbal. When the top cymbal comes into contact with the bottom cymbal, it is possible to suppress sounding of the bottom cymbal. Also, the inside air can be released through the notch portion. Thus, an impact sound generated when the top cymbal and the bottom cymbal come into contact can be suppressed.

The top cymbal has the pad with the striking surface and the frame that supports the pad. The edge sensor detects a strike by the player is attached to the peripheral edge portion of the frame. The pad continuously extends from the center toward the peripheral edge portion. The frame continuously extends from the center toward the peripheral edge portion. The peripheral edge portion of the frame has a larger inclination angle than that of the peripheral edge portion of the pad. Thus, when the player strikes the peripheral edge portion of the pad, the edge sensor can correctly and properly detect the strike.

The pad and the frame continuously extend from the respective centers toward the respective peripheral edge portions while having the predetermined curvatures. The curvature of the peripheral edge portion of the frame is set to be larger than the curvature of the peripheral edge portion of the pad. The peripheral edge portion of the frame has the larger inclination angle than the inclination angle of the peripheral edge portion of the pad. Thus, the edge sensor can correctly and properly detect the strike while the curvature of the pad is maintained.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a front elevation view of the top cymbal.

FIG. 7 is a sectional view taken along line VII-VII in FIG. 6.

DETAILED DESCRIPTION

Hereinafter, an embodiment will be described in detail with reference to the drawings.

Figure 1:
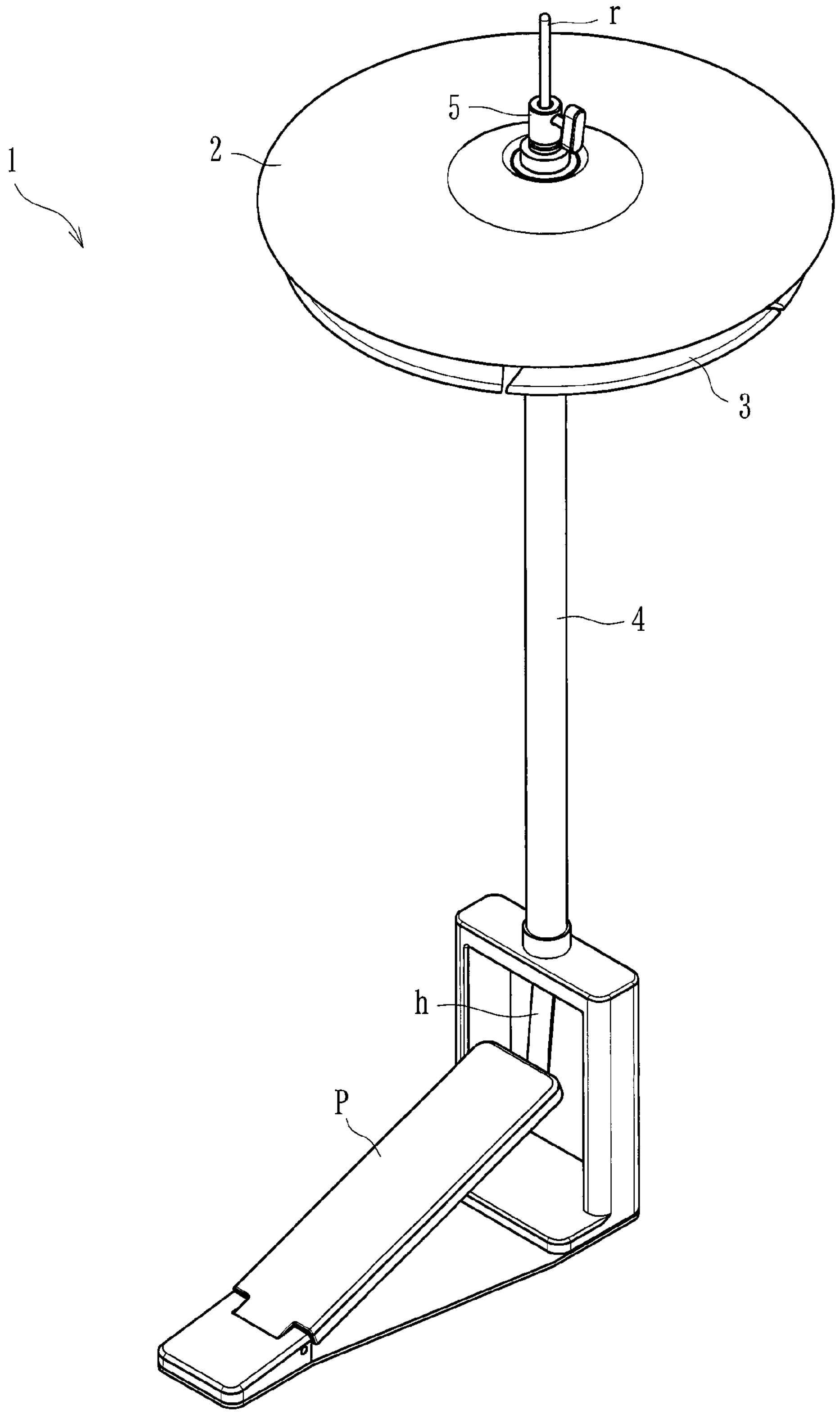
FIG. 1 is a perspective view illustrating an overall appearance of an electronic hi-hat.
Figure 2:
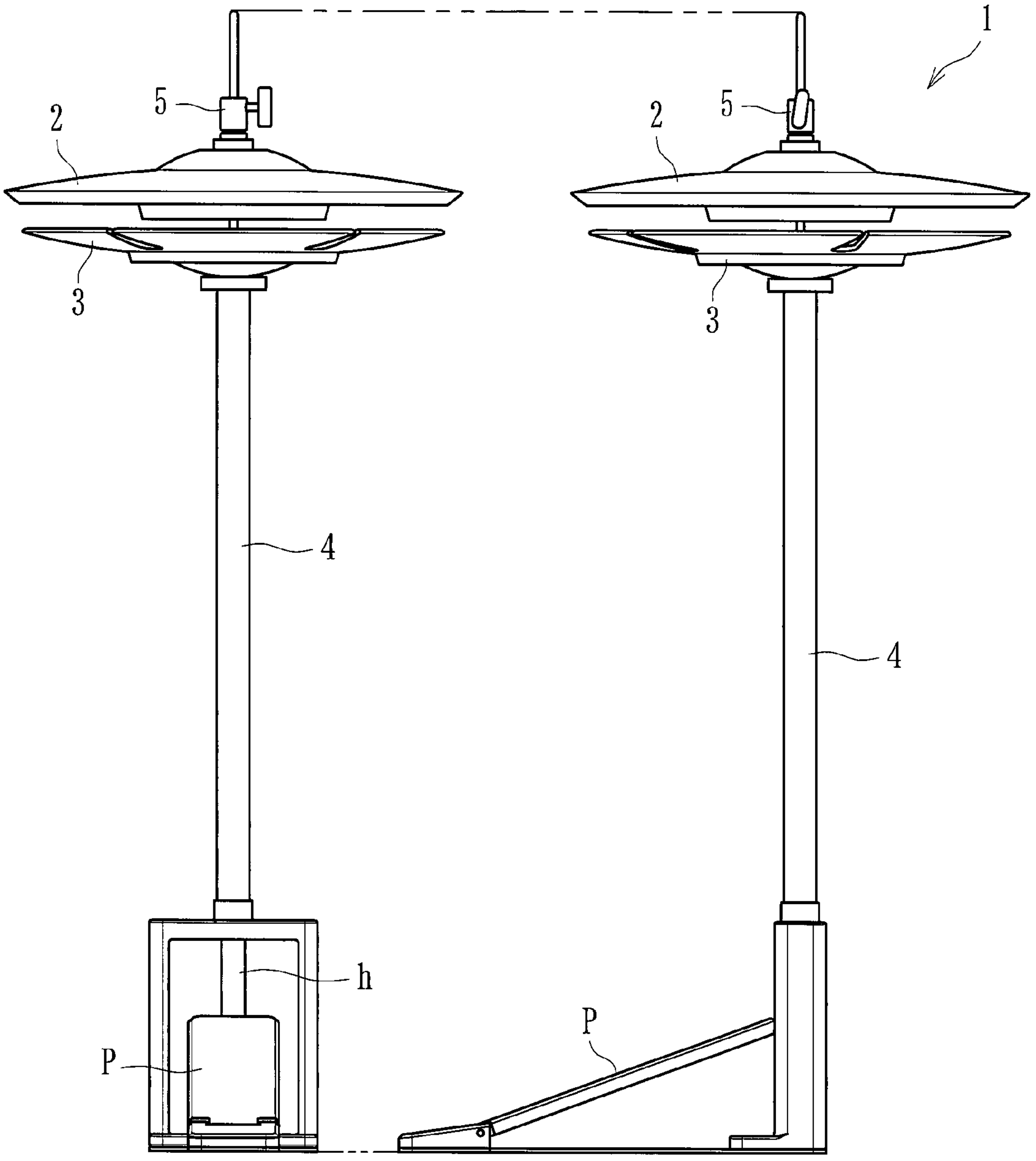
FIG. 2 is a front and side view illustrating the electronic hi-hat.
Figure 3:
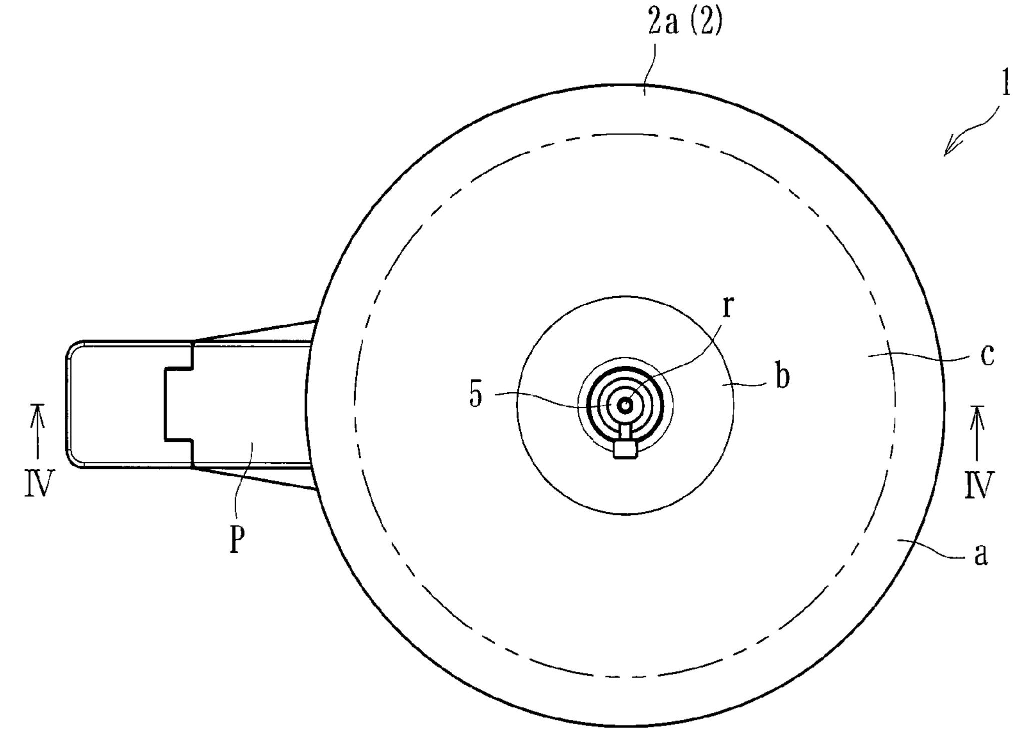
FIG. 3 is a top plan view illustrating the electronic hi-hat.
Figure 4:
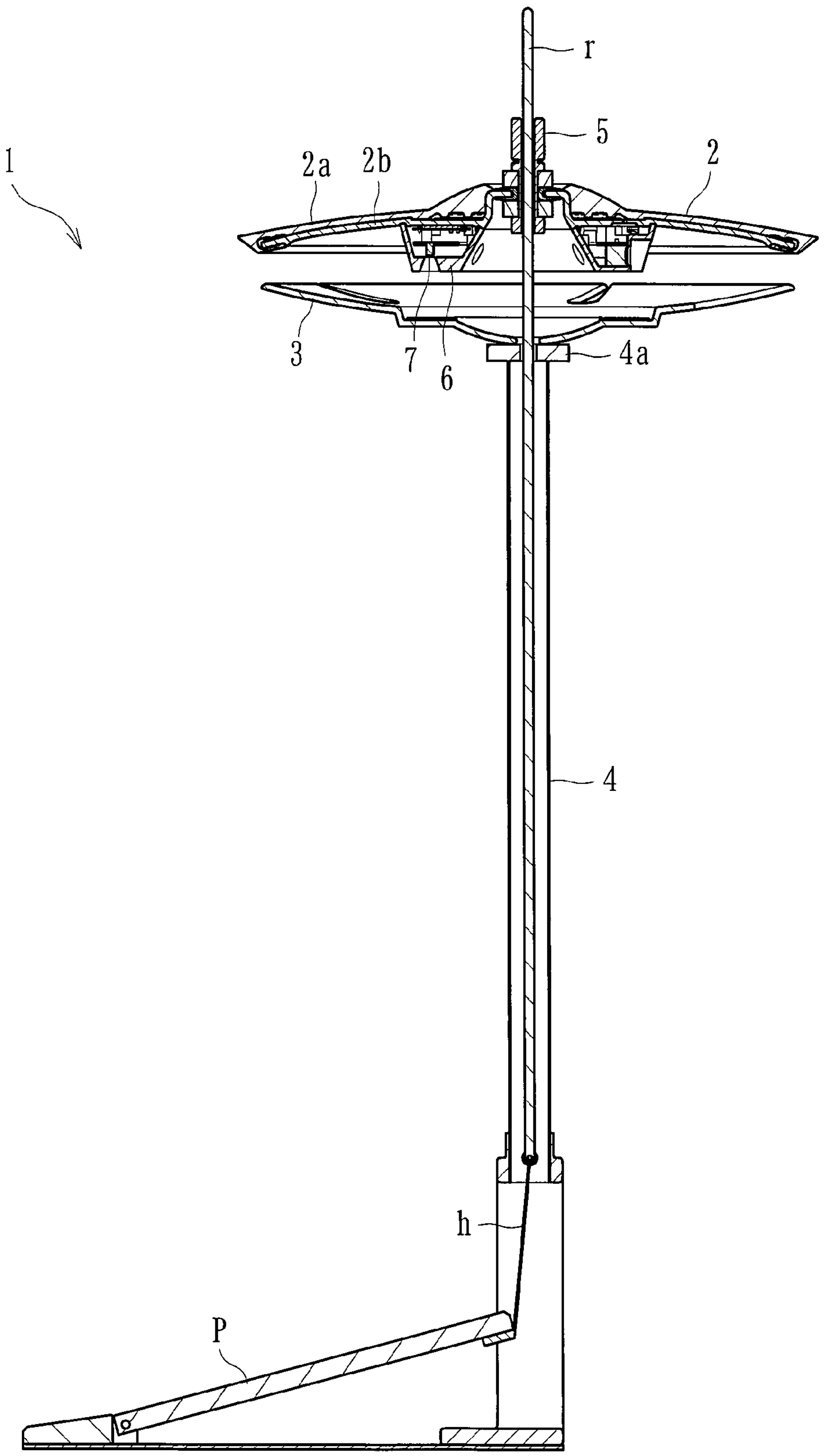
FIG. 4 is a sectional view taken along line IV-IV in FIG. 3.
Figure 5:
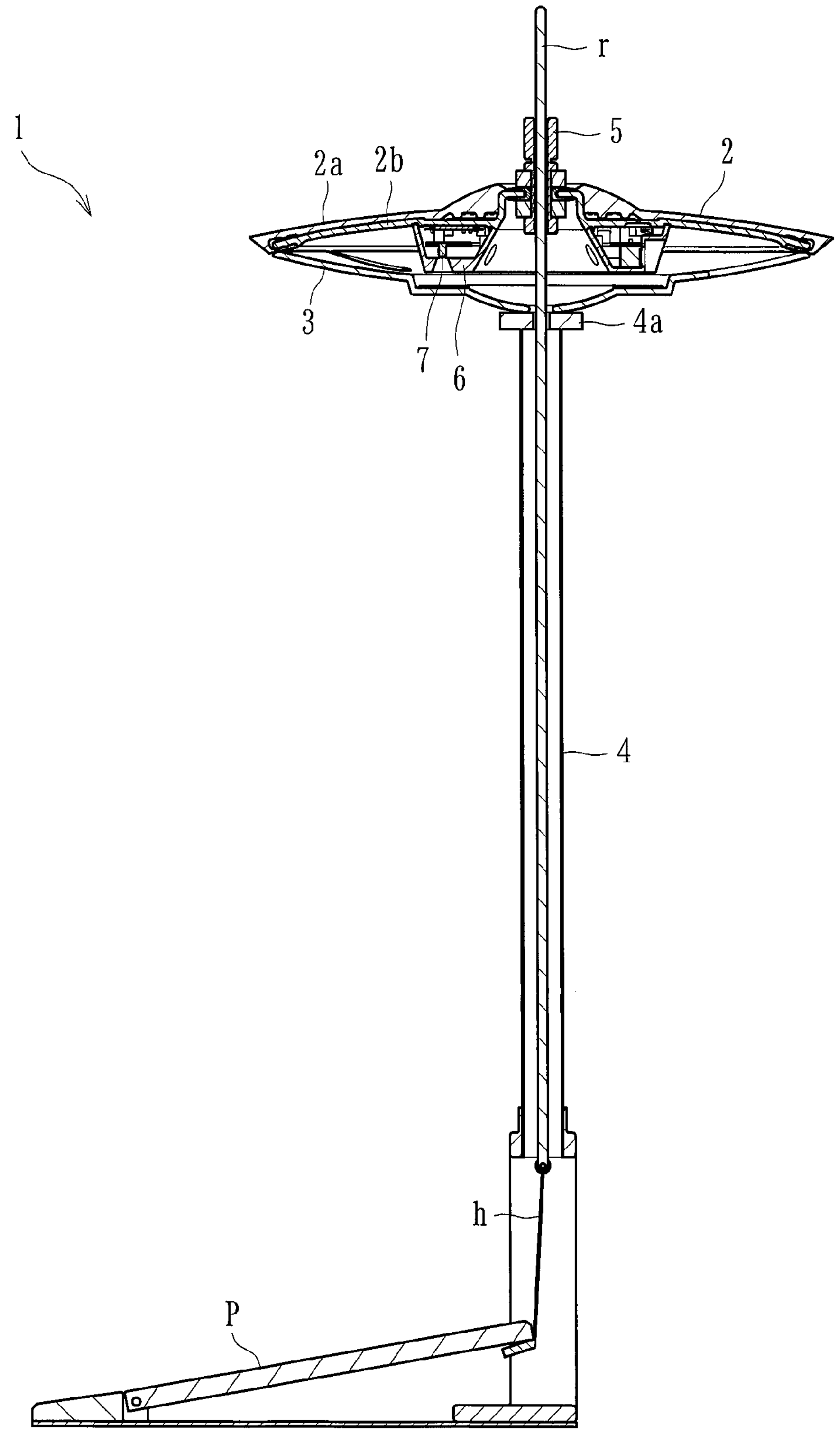
FIG. 5 is a sectional view like FIG. 4 where the top cymbal and the bottom cymbal are in contact with each other.
Figure 8:
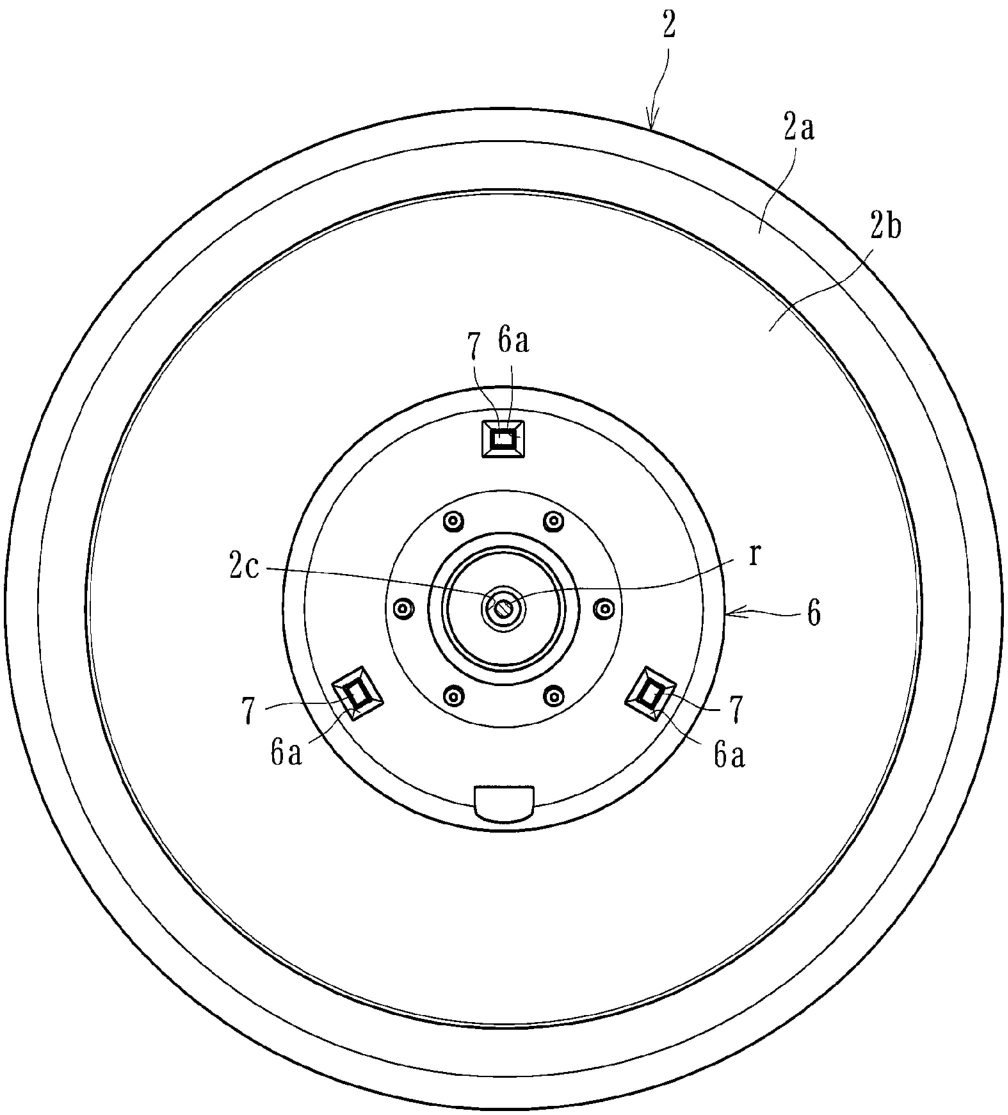
FIG. 8 is a top plan view of the top cymbal with the holding portion attached.

As illustrated in FIGS. 1 to 5, an electronic hi-hat 1 includes a rod r, a top cymbal 2, a bottom cymbal 3, an optical sensor 7, a support member 4 and a pedal P. In FIGS. 7 and 8, the optical sensor serves as the detector (distance sensor). The support member 4 supports the bottom cymbal 3. The pedal P enables a player to perform a stepping operation. The electronic hi-hat 1 can make the output at the time of striking a striking surface of the top cymbal 2 different in accordance with contact (see FIG. 5) or separation (see FIG. 4) between the top cymbal 2 and the bottom cymbal 3.

The rod r includes a metal rod-shaped member inserted through the support member 4 and extends in an up-down direction. A lower end portion of the rod r is coupled to the pedal P, via an operating portion h. A clutch 5 is attached to an upper end side of the rod r. The top cymbal 2 is fixed to the rod r by the clutch 5. Thus, the rod r is movable up and down in accordance with the stepping operation performed by the player on the pedal P. The top cymbal 2 moves in the up-down direction in accordance with the up and down movement of the rod r.

The top cymbal 2 vibrates when struck with a stick held by the player. As illustrated in FIGS. 6 and 7, the top cymbal 2 includes a disk-shaped member with an insertion hole 2*c* through which the rod r is inserted at the center of the top cymbal 2. The top cymbal 2 integrates a pad 2*a* that is made of a rubber material, resin foam, or the like and that can be struck with the stick. A frame 2*b*, made of a metallic material or a resin material, supports the pad 2*a*. In the top cymbal 2, the rod r is inserted through the insertion hole 2*c*. The top cymbal 2 is fixed to the rod r by the clutch 5. Thus, the top cymbal 2 is movable up and down with the movement of the rod r. A soft material, such as felt, is interposed between the clutch 5 and the rod r. This allows the top cymbal 2 to swing and suppress the transmission of operation noise of the pedal P to a vibration sensor of the top cymbal 2.

Figure 11:
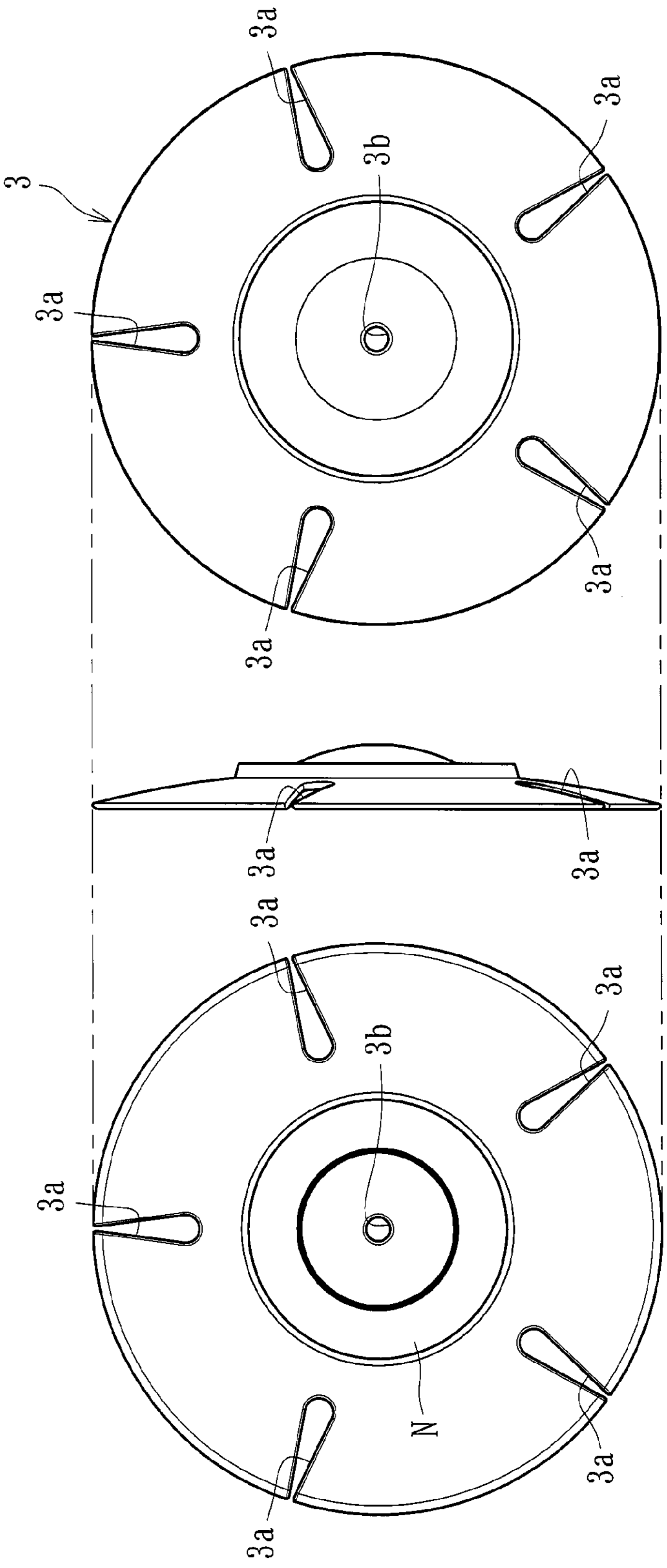
FIG. 11 is a plan view, a side view, and a back plan view of the bottom cymbal.

The bottom cymbal 3 is fixedly mounted on the support member 4 facing the top cymbal 2 in the up-down direction. The bottom cymbal 3 comes into contact with or is separated from the top cymbal 2 that moves up and down with the movement of the rod r. As illustrated in FIG. 11, the bottom cymbal 3 includes a disk-shaped member made of a rubber material, resin foam, or the like corresponding to the top cymbal 2. The bottom cymbal 3 has an insertion hole 3*b* through which the rod r is inserted at the center of the bottom cymbal 3. A reflection surface N reflects light emitted from the optical sensor 7. A notch portion 3*a* is formed as an elastically deformable region.

The reflection surface N includes an annular surface for reflecting the light emitted from the optical sensor 7 attached to the top cymbal 2. In order to make the reflection reliably and properly, it is preferable to apply mirror surface processing or attach a PVC foam sheet of white color or another color. The notch portion 3*a* is formed from a peripheral edge portion of the bottom cymbal 3 toward the center. It includes a region that is elastically deformable by a pressing force generated when the top cymbal 2 comes into contact with the bottom cymbal 3. A plurality of (five in the present embodiment) notch portions 3*a* are formed at equal intervals in the circumferential direction.

An upper surface of the pad 2*a* is formed with a striking surface. The striking surface includes an edge portion a, a cup portion b, and a bow portion c that can be struck by the player. As illustrated in FIG. 7, it is continuously curved and extended from the center toward a peripheral edge portion while having a curvature (curvature radius R). In contrast, the frame 2*b* is made of a resin material or a metallic material integrally formed on a back surface side of the pad 2*a*. As illustrated in the same drawing, an upper surface of the frame 2*b* is continuously curved and extended from the center toward the vicinity of a peripheral edge portion with a curvature (curvature radius R) equal to that of the pad 2*a*. The peripheral edge portion of the frame 2*b* is inclined with a larger curvature (curvature radius R>R') than the curvature, and is formed to have a larger inclination angle than that of the pad 2*a*.

As described above, the curvature of the peripheral edge portion of the frame 2*b* is set to be larger than the curvature of the peripheral edge portion of the pad 2*a*. The curvature radius R' is set to be smaller than the curvature radius R. Thus, the peripheral edge portion of the frame 2*b* is formed to have a larger inclination angle than that of the peripheral edge portion of the pad 2*a*. Moreover, a clearance with a dimension t is formed between the tip of a protrusion 2*aa*, formed on the pad 2*a*, and an edge sensor S1 (described later) formed in the peripheral edge portion of the frame 2*b*.

Figure 10:
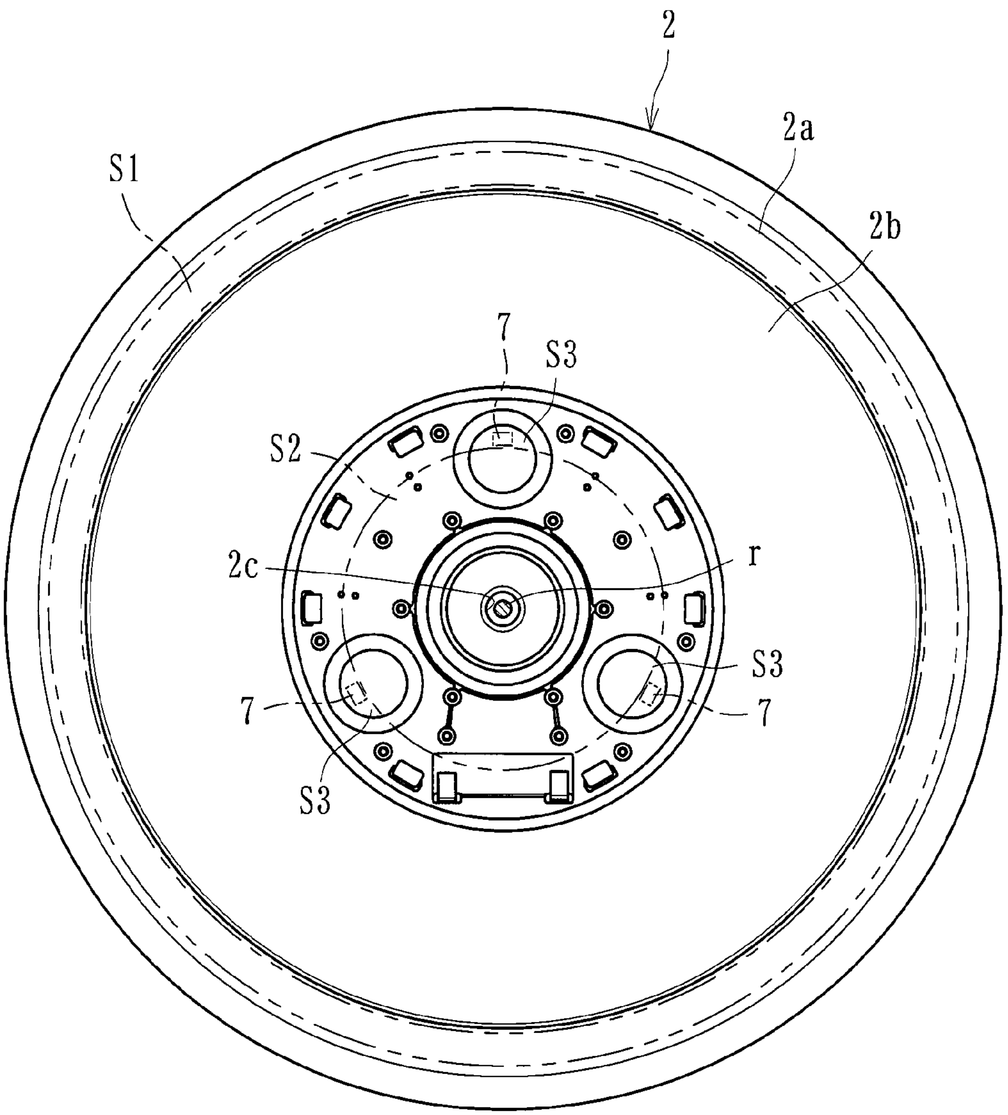
FIG. 10 is a view like FIG. 8 of the top cymbal with the holding portion and a substrate attached.

Furthermore, as illustrated in FIGS. 7 and 10, the edge sensor S1 and a cup sensor S2, each including a sheet switch, are attached to an upper surface of the peripheral edge portion and an upper surface of a central portion of the frame 2*b*. When the edge portion a of the pad 2*a* is struck, the edge sensor S1 is electrically turned on and can detect the strike. When the cup portion b of the pad 2*a* is struck, the cup sensor S2 is electrically turned on and can detect the strike. The edge sensor S1 and the cup sensor S2 each can make an output in accordance with the strength of the strike detected by a vibration sensor S3 (described later).

As illustrated in FIG. 7, the vibration sensor S3 and the optical sensor 7, formed on a substrate 8, are attached to the back surface of the central portion of the frame 2*b*, according to the present embodiment. The vibration sensor S3 and the optical sensor 7 are covered with a cover 6. The vibration sensor S3 includes, for example, a piezo buzzer capable of detecting the strength of the strike by the player. As illustrated in FIG. 10, three sensors are disposed at the central portion of the frame 2*b*.

When the player strikes the pad 2*a* with the stick to vibrate the top cymbal 2, the strength of the strike is detected by the vibration sensor S3. An electric signal corresponding to the strength can be output to an external signal processing device (not illustrated) via an output jack 9. Note that the electric signal is identified in accordance with the on/off state of the edge sensor S1 and the on/off state of the cup sensor S2. When the edge sensor S1 and the cup sensor S2 are off and a strike is detected, it is determined that the bow portion c has been struck and the electric signal is output.

The optical sensor 7 is disposed in the top cymbal 2 and composed of a distance sensor capable of optically detecting the separation dimension between the top cymbal 2 and the bottom cymbal 3. The optical sensor 7 includes a light emitter that emits light to the reflection surface N of the bottom cymbal 3 and a light receiver that receives reflected light of the light. Hence, the optical sensor 7 can detect the separation dimension between the top cymbal 2 and the bottom cymbal 3. For example, the light emitter is composed of an LED that emits infrared light. When the reflected light reflected from the reflection surface N is received by the light receiver composed of a phototransistor, an electric signal corresponding to the amount of the received light is output. The separation dimension between the top cymbal 2 and the bottom cymbal 3 is detected.

The optical sensor 7 is disposed in the top cymbal 2 and the reflection surface N is disposed on the bottom cymbal 3. Alternatively, the optical sensor 7 may be disposed in the bottom cymbal 3 and the reflection surface N may be disposed on the top cymbal 2. That is, the optical sensor 7 is disposed in at least one of the top cymbal 2 and the bottom cymbal 3. The reflection surface N, that can reflect the light emitted from the optical sensor 7, is formed on the other one of the top cymbal 2 and the bottom cymbal 3.

The cover 6 is attached to cover the annular substrate 8. The cover 6 has a light guide portion 6*a* including a hole capable of exposing the optical sensor 7 to face downward at a position corresponding to the optical sensor 7 formed on the substrate 8. The light guide portion 6*a* can pass the light from the optical sensor 7 and the reflected light from the reflection surface N. As illustrated in FIG. 7, the light guide portion 6*a* widens from the light emission position of the optical sensor 7 toward the reflection surface N (the width dimension increases downward).

Figure 9:
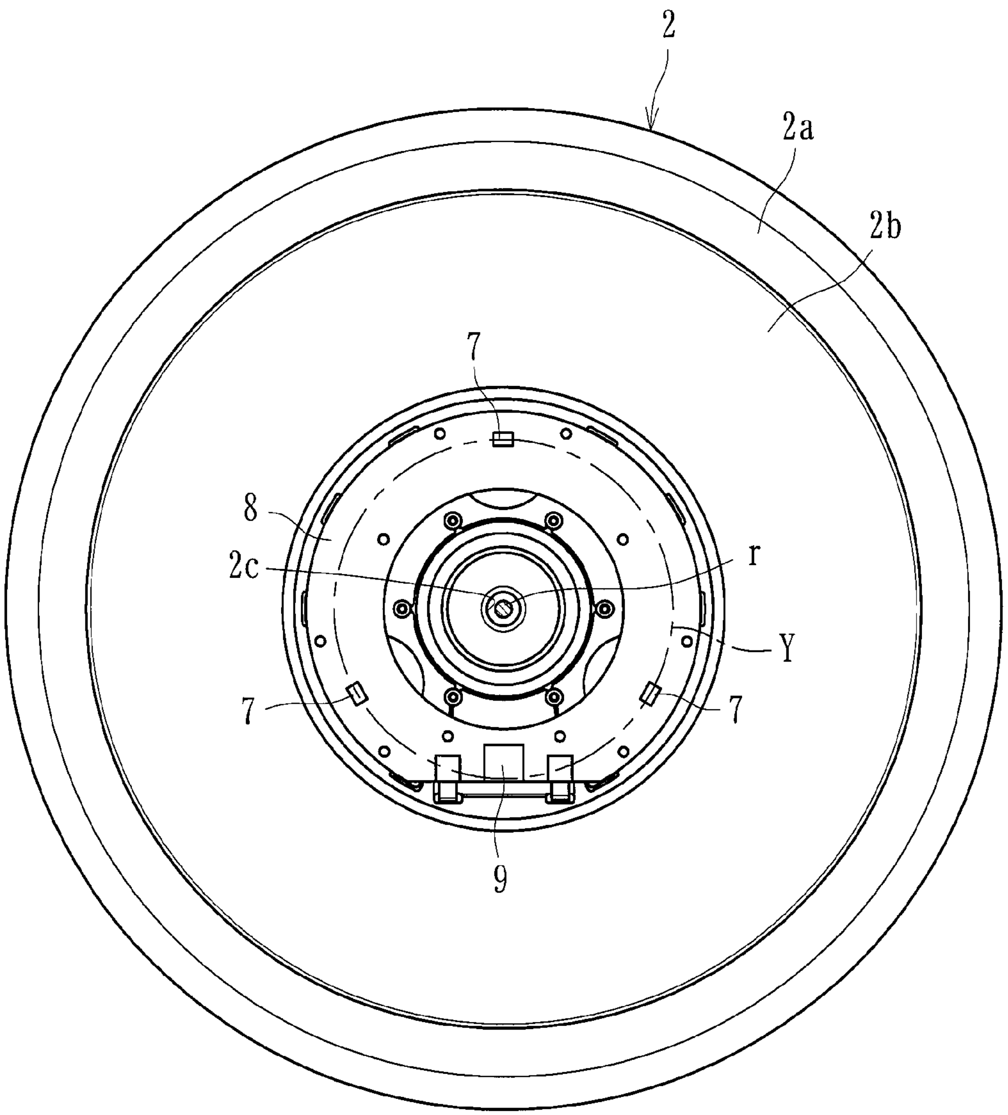
FIG. 9 is a view like FIG. 8 of the top cymbal with the holding portion removed.
Figure 15:
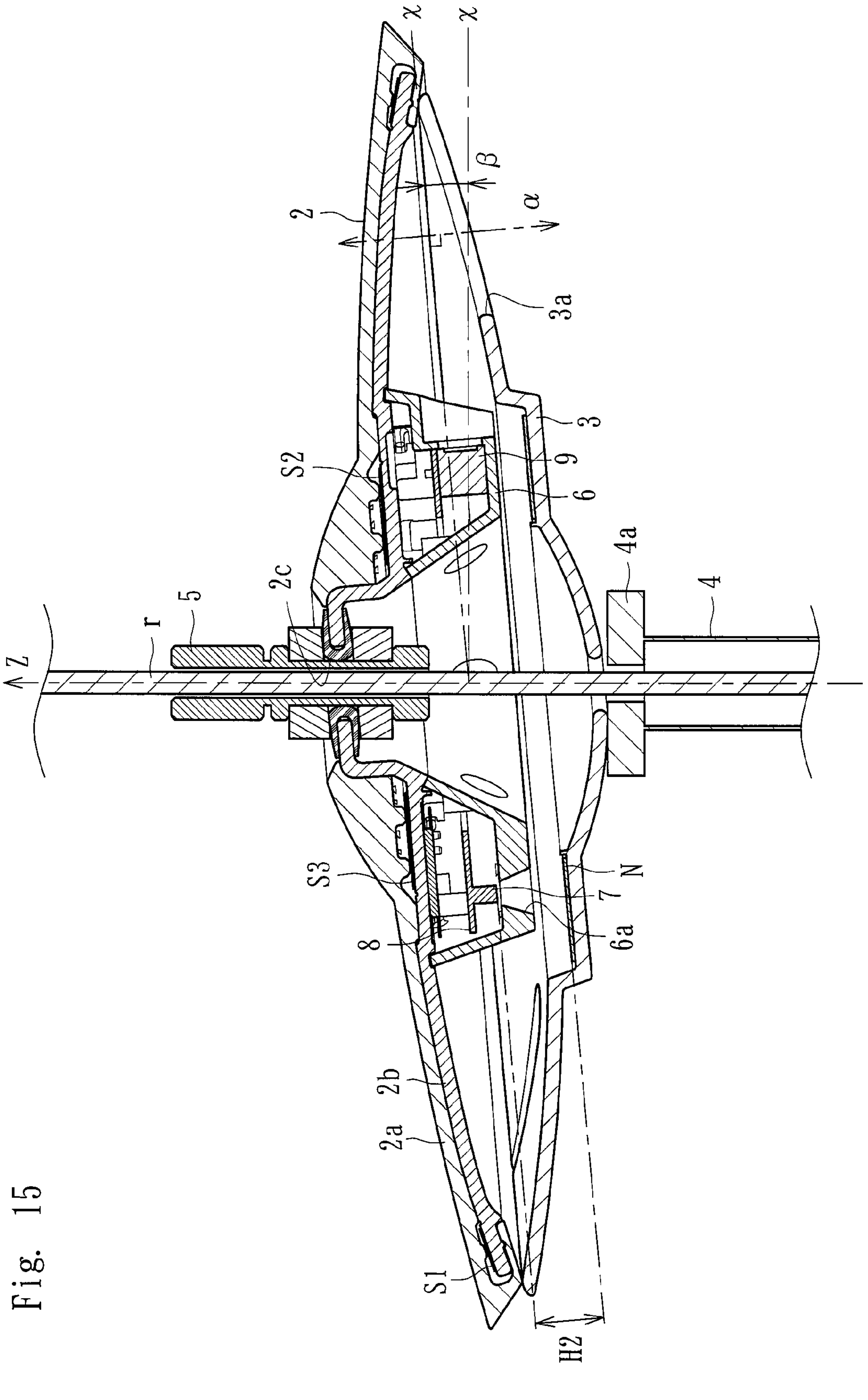
FIG. 15 is a sectional view like FIG. 12 where the top cymbal and the bottom cymbal are inclined with respect to a rod and the top cymbal and the bottom cymbal are in contact with each other.

The optical sensor 7 detects, in a non-contact manner, the separation dimensions of a plurality of areas that are displaced with inclinations of the top cymbal 2 and the bottom cymbal 3 with respect to the rod r. The plurality of areas of which the separation dimensions are detected are located on a common circumference of the top cymbal 2 and the bottom cymbal 3 around the rod r as the center. That is, as illustrated in FIGS. 8 to 10, the optical sensor 7 according to the present embodiment includes a plurality of (three) optical sensors 7 disposed on a virtual circle Y having a desirable diameter around the rod r as the center in the top cymbal 2. As illustrated in FIG. 15, when the top cymbal 2 and the bottom cymbal 3 are inclined, the optical sensors 7 each can detect a separation dimension in an inclination direction a instead of a separation dimension in a vertical direction z as in the related art.

In the same drawing, the z axis represents the vertical direction and the x axis represents the width direction. The top cymbal 2 and the bottom cymbal 3, in the contact state, are inclined only by an angle β. The width direction is inclined from the x direction to an x' direction. The optical sensors 7 each detect a separation dimension with respect to the inclination direction a orthogonal to the x' direction. Thus, when the separation dimension in the z direction is detected as in the related art, a dimension larger than the actual separation dimension may be detected. Thus, it may erroneously detect that the top cymbal 2 and the bottom cymbal 3 are in the separated state although the top cymbal 2 and the bottom cymbal 3 are in the contact state, which may prevent the desired output. In contrast, according to the present embodiment, the separation dimensions of the plurality of areas, that are displaced, with the inclinations of the top cymbal 2 and the bottom cymbal 3 with respect to the rod r can be detected. Thus, the separation dimensions with respect to the inclination direction a can be detected and the erroneous detection can be prevented from occurring.

Furthermore, the optical sensors 7 are disposed in areas at three positions separate at equal intervals on the common circumference (on the virtual circle Y) around the rod r as the center. They are capable of independently detecting the respective separation dimensions of the top cymbal 2 and the bottom cymbal 3. Relative angles, dimensions, or a positional relationship of the top cymbal 2 and the bottom cymbal 3 can be calculated based on a plurality of detection values detected by the optical sensors 7. The optical sensors 7 are disposed in the areas at the three positions separate at the equal intervals on the common circumference (on the virtual circle Y) around the rod r as the center. Alternatively, the optical sensors 7 may be disposed in areas at three or more positions (areas at at least three positions).

Figure 12:
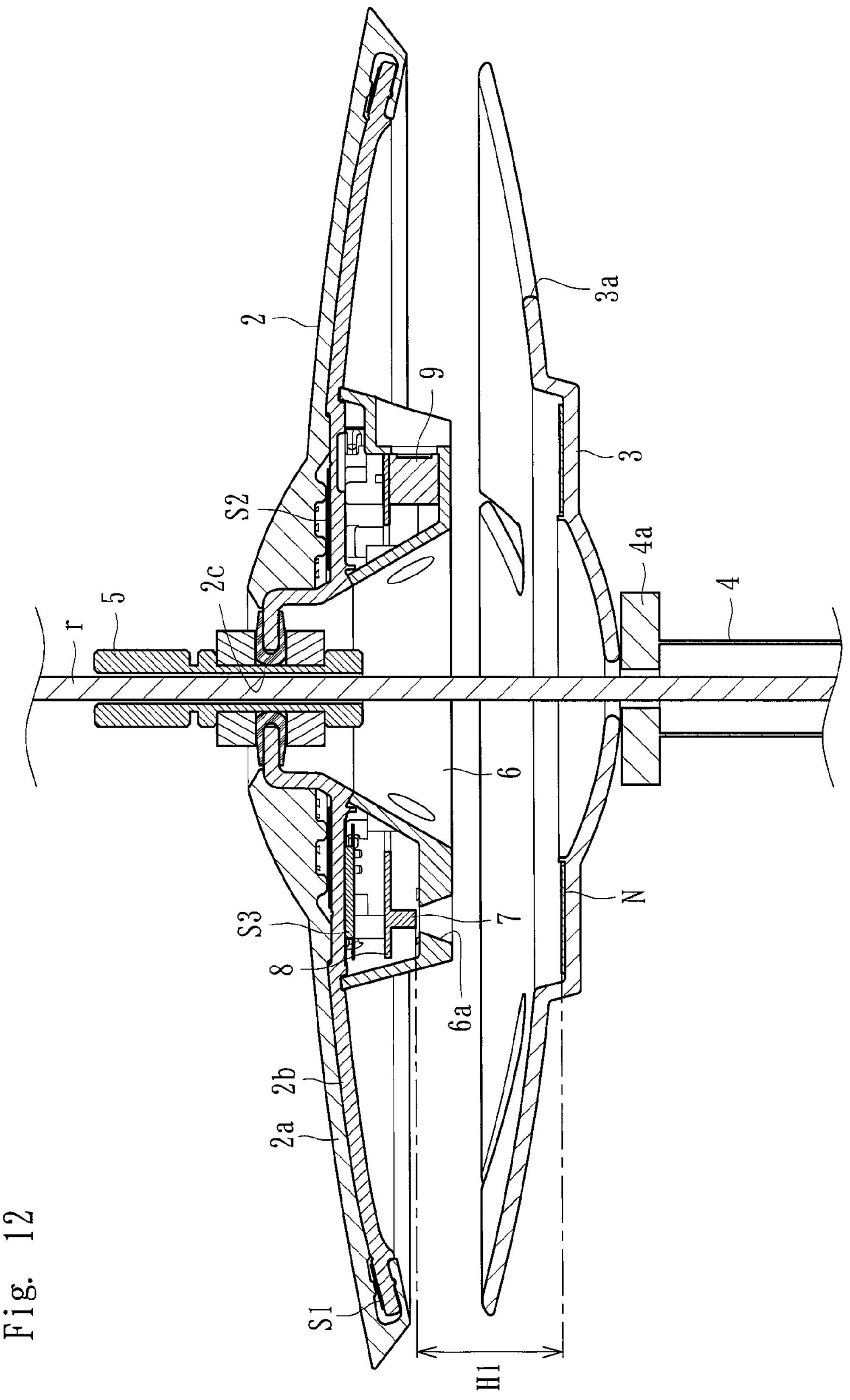
FIG. 12 is a sectional view of the top cymbal and the bottom cymbal separated from each other.
Figure 13:
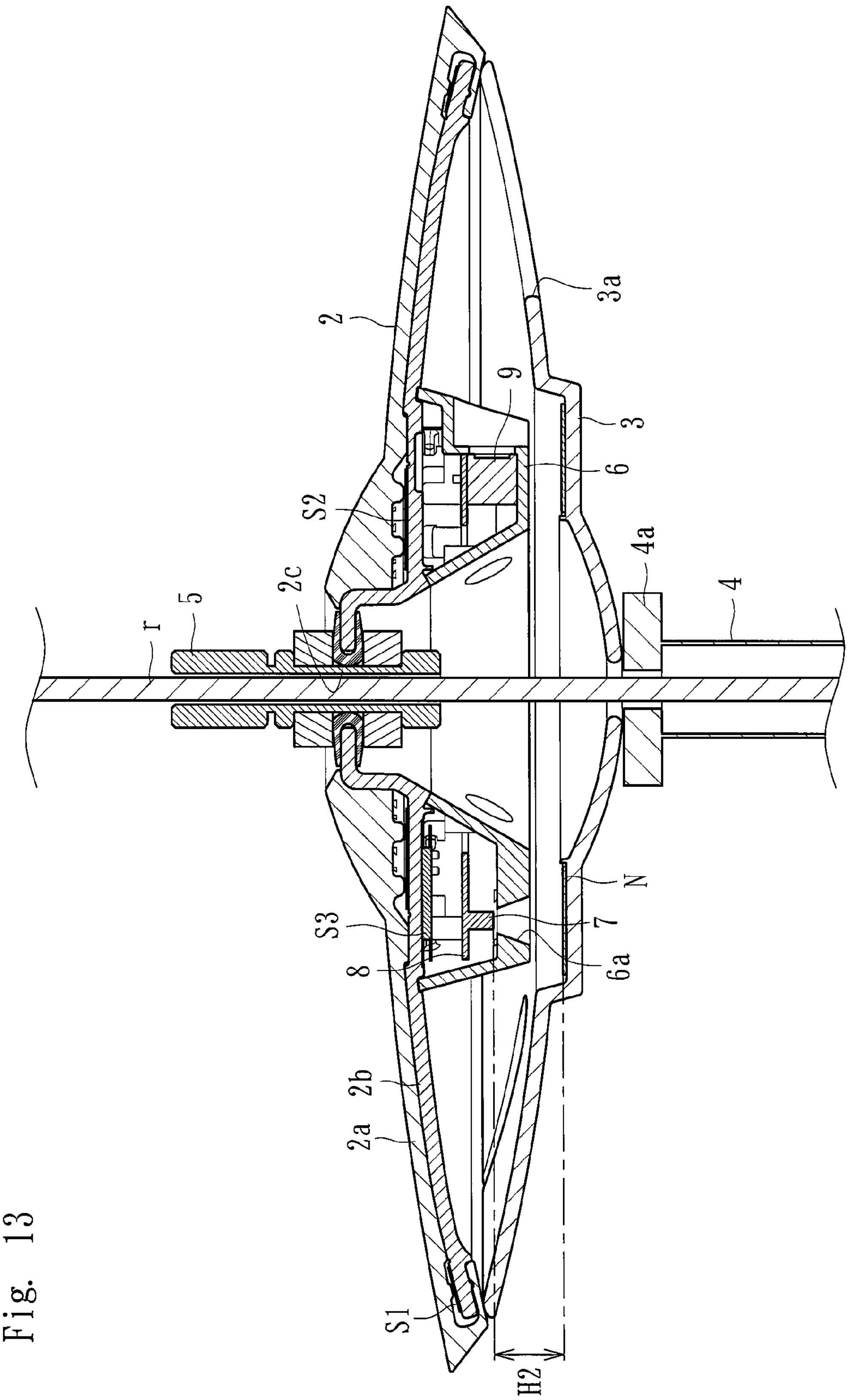
FIG. 13 is a sectional view like FIG. 12 where the top cymbal and the bottom cymbal in contact with each other.

With the above-described configuration, it is possible to detect a separation dimension H1 between the top cymbal 2 and the bottom cymbal 3 in the state where the top cymbal 2 and the bottom cymbal 3 are separate from each other as illustrated in FIG. 12. It is possible to detect a separation dimension H2 (<H1) between the top cymbal 2 and the bottom cymbal 3 in the state where the top cymbal 2 and the bottom cymbal 3 are in contact with each other as illustrated in FIG. 13. Accordingly, when the separation dimension H1 is detected, an electric signal indicating the state where the top cymbal 2 and the bottom cymbal 3 are separate from each other can be output. When the separation dimension H2 is detected, an electric signal indicating the state where the top cymbal 2 and the bottom cymbal 3 are in contact with each other can be output. During performance, the output at the time of striking the striking surface can be made different in accordance with contact or separation between the top cymbal 2 and the bottom cymbal 3.

Figure 14:
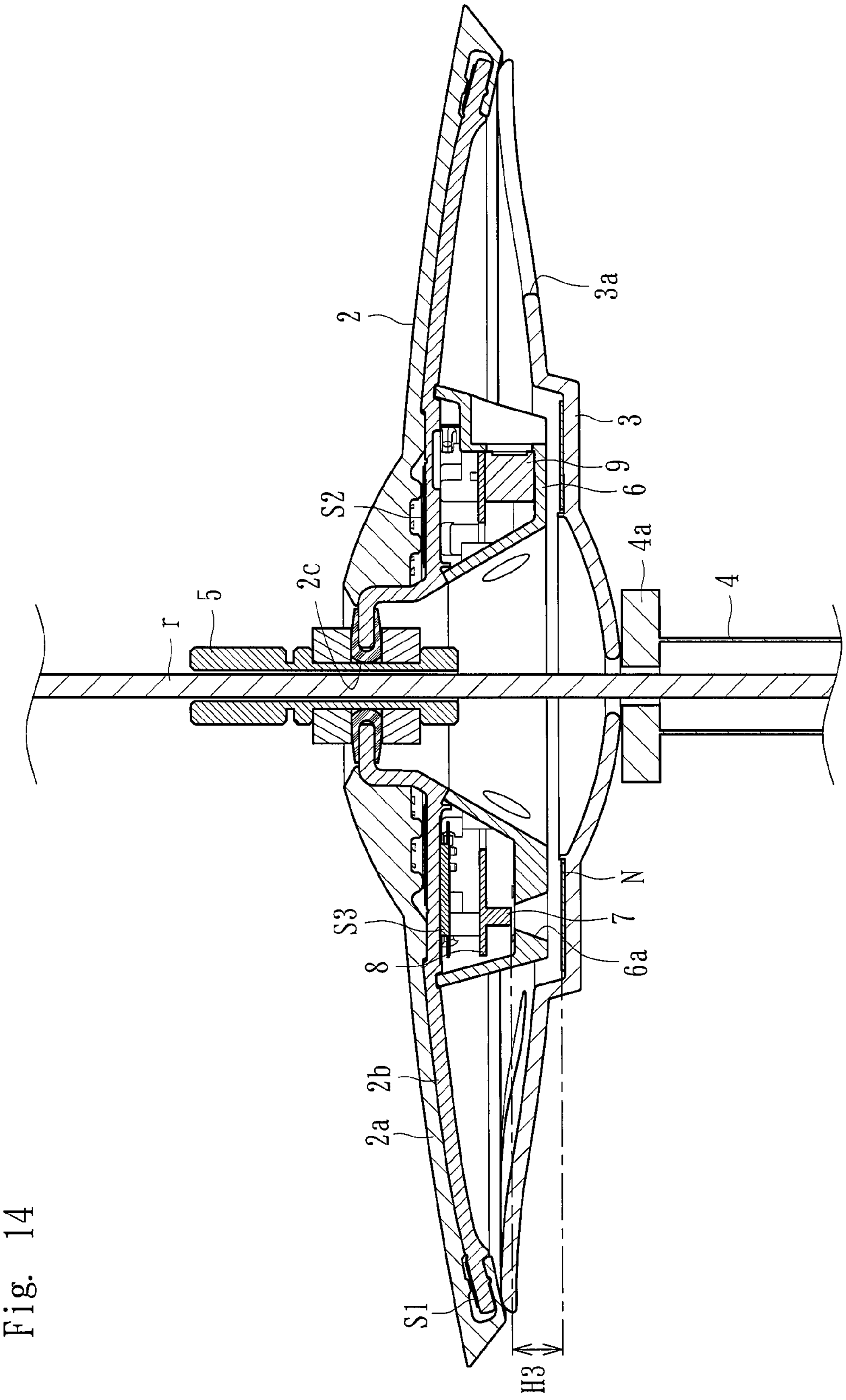
FIG. 14 is a sectional view like FIG. 12 where the top cymbal is further pressed against the bottom cymbal and are in contact with each other.

Further, the bottom cymbal 3 has the notch portions 3*a* as the region that is elastically deformable by the pressing force generated when the top cymbal 2 comes into contact with the bottom cymbal 3. Thus, when the player further steps on the pedal P to lower the rod r from the state where the top cymbal 2 and the bottom cymbal 3 are in contact with each other, the bottom cymbal 3 is compressed in the up-down direction as illustrated in FIG. 14. Thus, a separation dimension H3 (<H2) between the top cymbal 2 and the bottom cymbal 3 can be detected.

Next, a use form of the electronic hi-hat 1 will be described.

First, the top cymbal 2 and the bottom cymbal 3 are assembled to the support member 4 to assemble the electronic hi-hat 1. The output jack 9 and the signal processing device (not illustrated) are electrically connected to each other via a cable (not illustrated). This brings the electronic hi-hat 1 into a state available for performance. In this way, since the electronic hi-hat 1 is in the state available for performance, the optical sensors 7 in the top cymbal 2 are each supplied with power from the signal processing device, the light emitter emits light, and the light receiver outputs a detection signal corresponding to the amount of received light to the signal processing device.

When playing the electronic hi-hat 1, the player holds the stick with his/her hand and strikes the top cymbal 2. With the strike, the vibration sensor S3 outputs a detection signal corresponding to the vibration transmitted via the pad 2*a* and the frame 2*b* to the signal processing device via the output jack 9. When the light emitted from the light emitter is reflected by the reflection surface N and received by the light receiver, the optical sensors 7 disposed in the top cymbal 2 each output a detection signal corresponding to the amount of received light to the signal processing device, via the output jack 9.

Thus, the signal processing device generates a musical sound signal based on the detection signals acquired by the vibration sensor S3 and the optical sensors 7, and outputs the musical sound signal to an external speaker. Specifically, the signal processing device determines whether or not the top cymbal 2 is in contact with the bottom cymbal 3 by identifying the position in the up-down direction of the top cymbal 2 based on the detection signals acquired from the optical sensors 7. It generates a musical sound signal of the strength and timbre to be output via the external speaker with the contact or separation state of the top cymbal 2 with respect to the bottom cymbal 3 and the detection signal acquired from the vibration sensor S3.

For example, when it is determined that the top cymbal 2 is in contact with the bottom cymbal 3, the signal processing device generates a musical sound signal in the case where the top cymbal 2 is in contact with the bottom cymbal 3. When it is determined that the top cymbal 2 is separate from the bottom cymbal 3, the signal processing device generates a musical sound signal in the case where the top cymbal 2 is separate from the bottom cymbal 3.

More specifically, when the player steps on the pedal P, the top cymbal 2 moves downward as the rod r moves downward and comes into contact with the bottom cymbal 3. Then, the optical sensors 7 each detect the separation dimension H2 (see FIG. 13) between the top cymbal 2 and the bottom cymbal 3 based on the reflected light reflected from the reflection surface N. Thus, since it is determined that the top cymbal 2 and the bottom cymbal 3 are in contact with each other, a musical sound signal in the case where the top cymbal 2 and the bottom cymbal 3 are in contact with each other is generated by the signal processing device and is output via the external speaker.

When the player further steps on the pedal P from the state where the top cymbal 2 and the bottom cymbal 3 are in contact with each other, the top cymbal 2 moves further downward as the rod r moves downward, and the bottom cymbal 3 is compressed in the up-down direction. Then, the optical sensors 7 each detect the separation dimension H3 (see FIG. 14) between the top cymbal 2 and the bottom cymbal 3 based on the reflected light reflected from the reflection surface N. Thus, since it is determined that the bottom cymbal 3 is compressed by the top cymbal 2, a musical sound signal in the case where the bottom cymbal 3 is compressed by the top cymbal 2 is generated by the signal processing device and is output via the external speaker.

Furthermore, in a case where the player weakens or releases the stepping-on of the pedal P, when the rod r moves upward by an urging force of a coil spring (not illustrated), the optical sensors 7 each detect the separation dimension H1 (see FIG. 12) between the top cymbal 2 and the bottom cymbal 3 based on the reflected light reflected from the reflection surface N. Thus, since it is determined that the top cymbal 2 and the bottom cymbal 3 are separate from each other, a musical sound signal in the case where the top cymbal 2 and the bottom cymbal 3 are separate from each other is generated by the signal processing device and is output via the external speaker.

In this embodiment, when the player steps on the pedal P in a state where the top cymbal 2 is inclined, the top cymbal 2 moves downward as the rod r moves downward and comes into contact with the bottom cymbal 3. Then, the optical sensors 7 each detect the separation dimension H2 (see FIG. 15) between the top cymbal 2 and the bottom cymbal 3 based on the reflected light reflected from the reflection surface N. Thus, since it is determined that the top cymbal 2 and the bottom cymbal 3 are in contact with each other, a musical sound signal in the case where the top cymbal 2 and the bottom cymbal 3 are in contact with each other is generated by the signal processing device and is output via the external speaker.

According to the present embodiment, the optical sensors 7 (detector) are capable of detecting the separation dimensions of the plurality of areas that are displaced with the inclinations of the top cymbal 2 and the bottom cymbal 3 with respect to the rod r. The plurality of areas where the separation dimensions are detected are located on the common circumference of the top cymbal 2 and the bottom cymbal 3 around the rod r as the center. Thus, even when the top cymbal 2 and the bottom cymbal 3 are inclined with respect to the rod r, the separation dimension between the top cymbal 2 and the bottom cymbal 3 can be accurately detected.

Moreover, the optical sensors 7 (detector) are capable of detecting the separation dimensions of the areas at the at least three or more positions separate at the equal intervals on the common circumference of the top cymbal 2 and the bottom cymbal 3 around the rod r as the center. Thus, by electrically averaging or electronically calculating the detection values of the respective optical sensors 7 (detector), the average separation dimension can be detected even when one of the top cymbal 2 and the bottom cymbal 3 is inclined.

Furthermore, the optical sensors 7 (detector) include the distance sensors disposed in at least one of the top cymbal 2 and the bottom cymbal 3. The distance sensors detect, in the non-contact manner, the separation dimensions of the plurality of areas that are displaced with the inclinations of the top cymbal 2 and the bottom cymbal 3 with respect to the rod r. Thus, the contact or the separation between the top cymbal 2 and the bottom cymbal 3 can be reliably detected. Accordingly, during performance, the player can bring the top cymbal 2 and the bottom cymbal 3 into contact with each other or separate the top cymbal 2 and the bottom cymbal 3 from each other without feeling discomfort.

Furthermore, the distance sensor includes the optical sensor 7 that can detect the separation dimension by emitting light and receiving reflected light of the light. The reflection surface N, that reflects the light emitted from the optical sensor 7, is formed on the other one of the top cymbal 2 and the bottom cymbal 3. Thus, the separation dimension between the top cymbal 2 and the bottom cymbal 3 can be detected using the optical sensor 7 that is relatively inexpensive and has high detection accuracy.

The provided light guide portion 6*a* widens from the light emission position of the optical sensor 7 toward the reflection surface N. Thus, it is possible to prevent erroneous detection due to ambient brightness from occurring, and to stably and accurately detect the separation dimension between the top cymbal 2 and the bottom cymbal 3. Furthermore, the relative angles, the dimensions, or the positional relationship of the top cymbal 2 and the bottom cymbal 3 can be calculated based on the plurality of detection values detected by the optical sensors 7 (detector). Thus, the relative angles, the dimensions, or the positional relationship of the top cymbal 2 and the bottom cymbal 3 can be reflected on the output during performance.

In addition, the bottom cymbal 3 has the region that is elastically deformable by the pressing force generated when the top cymbal 2 comes into contact with the bottom cymbal 3. Accordingly, the separation dimension between the top cymbal 2 and the bottom cymbal 3 can be changed by the pressing force generated when the top cymbal 2 and the bottom cymbal 3 come into contact with each other. The change in the separation dimension can be reflected on the output during performance. In particular, the region that is elastically deformable in the present embodiment includes the notch portions 3*a* in the bottom cymbal 3. When the top cymbal 2 comes into contact with the bottom cymbal 3, it is possible to suppress sounding of the bottom cymbal 3 having a surface shape. Moreover, when the top cymbal 2 comes into contact with the bottom cymbal 3, the inside air can be released through the notch portions 3*a*. Thus, an impact sound generated when the top cymbal 2 and the bottom cymbal 3 come into contact with each other can be suppressed.

The top cymbal 2 has the pad 2*a* with the striking surface and the frame 2*b* that supports the pad 2*a*. The edge sensor S1, that can detect a strike by the player, is attached to the peripheral edge portion of the frame 2*b*. The pad 2*a* continuously extends from the center thereof toward the peripheral edge portion. The frame 2*b* continuously extends from the center toward the peripheral edge portion. The peripheral edge portion of the frame 2*b* includes the larger inclination angle than that of the peripheral edge portion of the pad 2*a*. Thus, when the player strikes the peripheral edge portion of the pad 2*a*, the edge sensor S1 can correctly and properly detect the strike.

In particular, the pad 2*a* and the frame 2*b* continuously extend from the respective centers toward the respective peripheral edge portions while having the predetermined curvatures. The peripheral edge portion of the frame 2*b* is set to have the larger curvature than the curvature of the peripheral edge portion of the pad 2*a*. Thus, the curvature radius R' of the peripheral edge portion of the frame 2*b* is set to be smaller than the curvature radius R of the peripheral edge portion of the pad 2*a*. Thus, the peripheral edge portion of the frame 2*b* includes the larger inclination angle than the inclination angle of the peripheral edge portion of the pad 2*a*. Thus, the edge sensor S1 can accurately and properly detect a strike even when the striking direction with the stick is at an angle close to a lateral orientation in the horizontal direction while the curvature of the pad 2*a*, that is, the curvature of the striking surface is maintained.

The curvature of the peripheral edge portion of the pad 2*a* can be set such that the curvature radius R is about 1000 mm, within the range of R500 to R1500. The curvature of the peripheral edge portion of the frame 2*b* can be set such that the curvature radius R' is about 250 mm, within the range of R100 to R500. Moreover, the angle of the peripheral edge portion of the pad 2*a* can be set to about 10°, within the range of 5° to 15°, with respect to a horizontal plane. The angle of the peripheral edge portion of the frame 2*b* can be set to about 15°, within the range of 10° to 30°, with respect to the horizontal plane.

While the present embodiment has been described above, the present disclosure is not limited. For example, instead of the optical sensor 7 capable of detecting the separation dimension between the top cymbal 2 and the bottom cymbal 3, any other sensors such as an electrostatic capacitance sensor that measures the distance between electrodes, an overcurrent displacement sensor that measures an overcurrent due to a metal plate and a magnetic field, and a laser ranging sensor may be used. When the optical sensor 7 according to the present embodiment is used, the reflection surface N that reflects the emitted light may be a flat surface or a reflection surface having a concave curved section that can efficiently collect and reflect light.

Furthermore, although the notch portions 3*a* are formed in the bottom cymbal 3, according to the present embodiment, another form may be employed as long as an elastically deformable region is provided. For example, the elastic region may be provided by a thin portion or a bellows-shaped portion, or the bottom cymbal 3 may be divided into an inner peripheral portion and an outer peripheral portion that are coupled by an elastic member such as rubber. Note that it is preferable to set the elastically deformable region outside the half diameter of the outermost diameter of the bottom cymbal 3. Furthermore, in the top cymbal 2, according to the present embodiment, the curvature of the peripheral edge portion of the frame 2*b* is set to be larger than the curvature of the peripheral edge portion of the pad 2*a*. However, the peripheral edge portion of the frame 2*b* may have a larger inclination angle than that of the peripheral edge portion of the pad 2*a* by forming the upper surface of the frame 2*b* in a linear shape like a slope with a gentle angle from the center toward the peripheral edge portion.

As far as an electronic hi-hat includes detector capable of detecting separation dimensions of a plurality of areas that are displaced in accordance with inclinations of a top cymbal and a bottom cymbal with respect to a rod, and the plurality of areas where the separation dimensions are detected are located on a common circumference of the top cymbal and the bottom cymbal around the rod as the center, the present disclosure is applicable to such an electronic hi-hat having a different appearance shape or such an electronic hi-hat having an additional function.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An electronic hi-hat comprising:

a rod movable up and down in accordance with an operation of a player;

a top cymbal, including a striking surface, that can be struck by the player and movable up and down in accordance with a movement of the rod;

a bottom cymbal attached to face the top cymbal, the bottom cymbal capable of coming into contact with or separating from the top cymbal that moves up and down in accordance with the movement of the rod; and a detector capable of detecting a separation dimension between the top cymbal and the bottom cymbal, the detector detects separation dimensions of a plurality of areas that are displaced with angular inclinations of the top cymbal and the bottom cymbal with respect to the rod, and the plurality of areas where the separation dimensions are detected are located on a common circumference of the top cymbal and the bottom cymbal around the rod as a center;

the detector includes a distance sensor, including a sensor and a reflection surface, one disposed in the top cymbal and the other disposed in the bottom cymbal, the distance sensor is capable of detecting, in a non-contact manner, the separation dimensions of the plurality of areas that are displaced with the angular inclinations of the top cymbal and the bottom cymbal with respect to the rod.

2. The electronic hi-hat according to claim 1, wherein the detector detects separation dimensions of areas at least three or more positions separate at equal intervals on the common circumference of the top cymbal and the bottom cymbal around the rod as the center.

3. The electronic hi-hat according to claim 1, wherein the distance sensor includes an optical sensor that can detect the separation dimensions by emitting light and receiving reflected light of the light, and a reflection surface that can reflect the light emitted from the optical sensor is formed on the other one of the top cymbal and the bottom cymbal.

4. The electronic hi-hat according to claim 3, further comprising a light guide portion that widens from a light emission position of the optical sensor toward the reflection surface.

5. The electronic hi-hat according to claim 1, wherein relative angles, dimensions, or a positional relationship of the top cymbal and the bottom cymbal are calculated based on a plurality of detection values detected by the detector.

6. The electronic hi-hat according to claim 1, wherein the bottom cymbal has a region that is elastically deformable by a pressing force generated when the top cymbal comes into contact with the bottom cymbal.

7. The electronic hi-hat according to claim 6, wherein the region that is elastically deformable includes a notch portion in the bottom cymbal.

8. The electronic hi-hat according to claim 1, wherein the top cymbal includes a pad with the striking surface and a frame that supports the pad, an edge sensor, that can detect a strike by the player, is attached to a peripheral edge portion of the frame, the pad continuously extends from a center toward a peripheral edge portion and the frame continuously extends from a center toward the peripheral edge portion, and the peripheral edge portion of the frame is formed to have a larger inclination angle than an inclination angle of the peripheral edge portion of the pad.

9. The electronic hi-hat according to claim 8, wherein the pad and the frame continuously extend from the respective centers toward the respective peripheral edge portions while having predetermined curvatures, a curvature of the peripheral edge portion of the frame is set to be larger than a curvature of the peripheral edge portion of the pad, and the peripheral edge portion of the frame is formed to have the larger inclination angle than the inclination angle of the peripheral edge portion of the pad.

* * * * *